Sept. 13, 1938. N. L. CAMPBELL Re. 20,853

METHOD OF PRODUCING FELT BASE FLOOR COVERINGS

Original Filed April 26, 1938 6 Sheets-Sheet 1

METHOD OF PRODUCING FELT BASE FLOOR COVERINGS

Original Filed April 26, 1938 6 Sheets-Sheet 2

Inventor:
Neil L. Campbell
by his Attorneys
Howson & Howson

Sept. 13, 1938. N. L. CAMPBELL Re. 20,853
METHOD OF PRODUCING FELT BASE FLOOR COVERINGS
Original Filed April 26, 1938 6 Sheets-Sheet 3
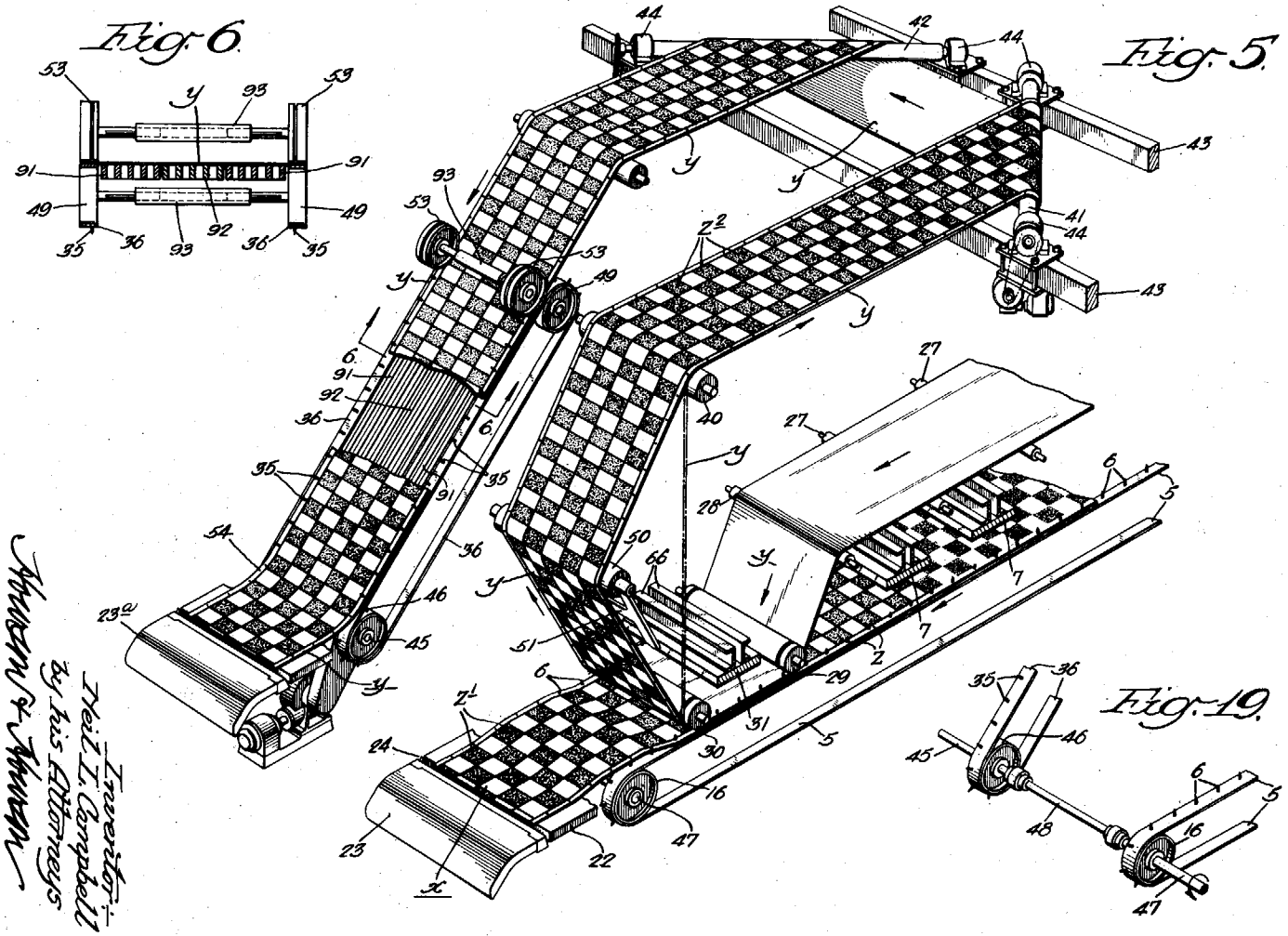
Inventor:
Neil L. Campbell
by his Attorneys
Howson & Howson Sept. 13, 1938. N. L. CAMPBELL Re. 20,853
METHOD OF PRODUCING FELT BASE FLOOR COVERINGS
Original Filed April 26, 1938 6 Sheets-Sheet 4
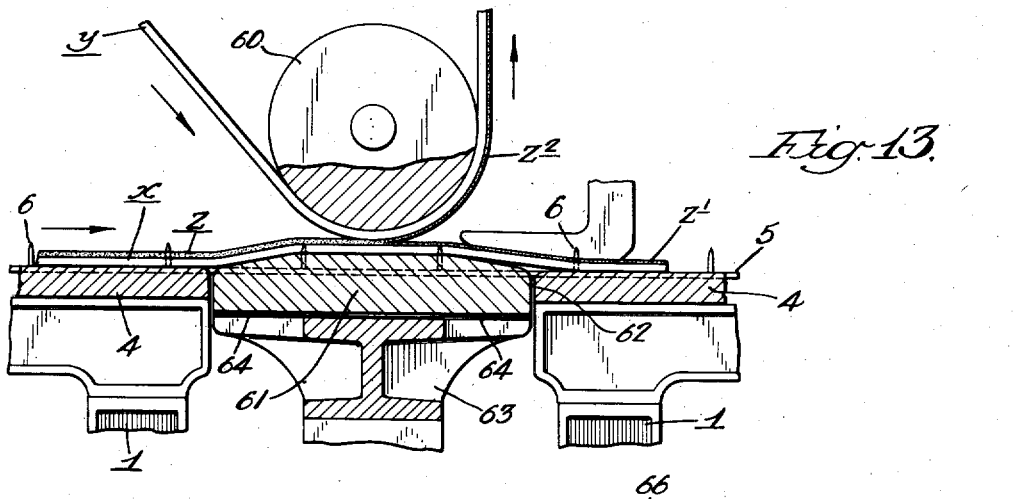
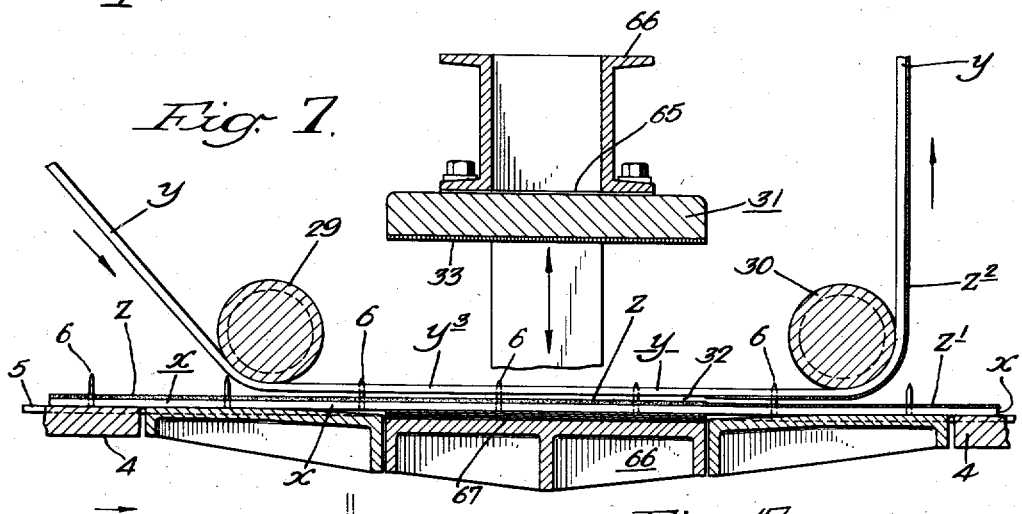
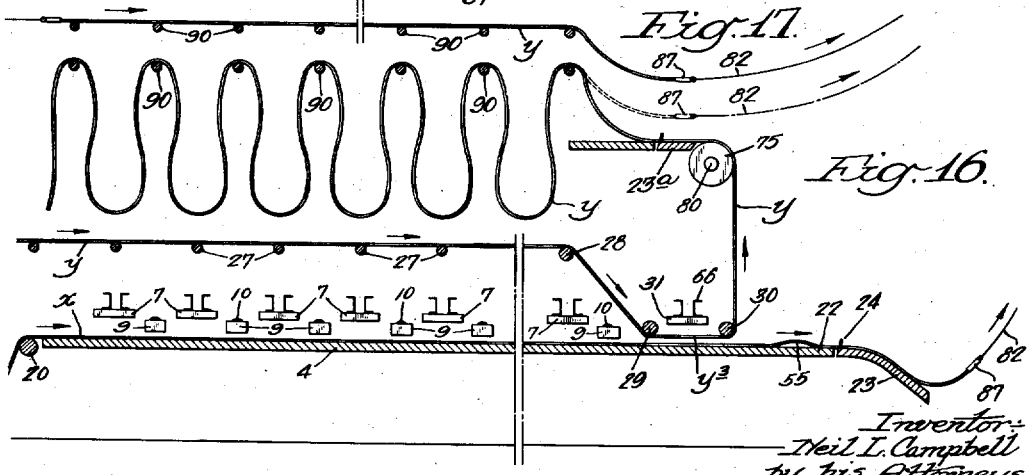
Inventor:
Neil L. Campbell
by his Attorneys
Howson & Howson

METHOD OF PRODUCING FELT BASE FLOOR COVERINGS

Original Filed April 26, 1938 6 Sheets-Sheet 5

Inventor:
Neil I. Campbell
by his Attorneys
Howson & Howson

Sept. 13, 1938. N. L. CAMPBELL Re. 20,853

METHOD OF PRODUCING FELT BASE FLOOR COVERINGS

Original Filed April 26, 1938 6 Sheets-Sheet 6

Inventor:
Neil L. Campbell
by his Attorneys
Howson & Howson

Reissued Sept. 13, 1938

Re. 20,853

UNITED STATES PATENT OFFICE 20,853

METHOD OF PRODUCING FELT BASE FLOOR COVERINGS

Neil L. Campbell, Salem, N. J., assignor to Mannington Mills, Incorporated, Salem, N. J., a corporation of New Jersey Original No. 2,123,646, dated July 12, 1938, Serial No. 204,445, April 26, 1938. Application for reissue July 26, 1938, Serial No. 221,450

15 Claims. (Cl. 41—26)

This invention relates to the manufacture of hard surface floor coverings such, for example, as those known in the art as felt base floor coverings, as distinguishing from linoleum, etc.

Felt base floor coverings consist of a sheet or strip of prepared felt which is commonly composed primarily of cotton or wool fibres or a combination of cotton, wool, and in some instances a small percentage of wood fibres matted together by a regular felting process and subsequently impregnated with asphalt and other ingredients rendering the felt substantially waterproof.

In some instances one face of the impregnated felt sheet is coated with a suitable paint, usually of a solid color, to form the underside of the finished floor covering. In other instances the underside of the sheet is coated with rubber or a rubber compound but which, in either case, does not enter into the present invention.

The second face of the felt base sheet which is to form the top, wear, or exposed surface in use is usually decorated with designs of various characters, including mottled designs, floral and/or foliage designs, blocks, tiles, etc.

The decoration of the top or wear surface is usually in the form of an aggregated coating of viscous pigments arranged in laterally adjacent abutting relation to each other and collectively depicting the design. The aggregating of the design elements is usually accomplished on what is known as a block printing machine, i. e., the impregnated base sheet or strip is intermittently advanced in a horizontal plane beneath a series of vertically reciprocable printing heads which are respectively provided on their under surfaces with wood cut blocks or flat faced pins or protuberances. Each head carries but one part of the design which is to be applied to the wear surface of the impregnated felt. The number of blocks used in completing the design depends upon the number of different colors found in the completed design, as each block is arranged to deposit but one color in proper position on the prepared felt base sheet as the sheet is advanced step by step and brought to rest under the printing blocks successively.

During the period of rest a paint reservoir, provided with an applying roll, is traversed beneath each block, with the roller in contact with the wood cut or pin faces to apply a predetermined amount of the viscous pigment to the printing surface of the block, there being one reservoir for each block to apply the particular color required for the particular part of the design carried by the block.

After the reservoir rollers have applied their respective pigments to the printing surfaces of the blocks, the blocks are lowered into printing contact with the surface of the prepared felt disposed beneath the blocks. The blocks are then raised and the felt advanced one step, to bring each partly completed design into registry with the next block to receive the portion of the design depicted by that particular block.

After a predetermined length of the strip of felt emerges from the last printing block the strip is cut and the finished sheet of said predetermined length, usually a strip of approximately 80 feet in length, is carried into a suitable dryer in which the pigments are permitted to set and/or harden.

The object of the present invention is to produce two identical strips from or by but one printing of the complete design and thereby double the capacity of the machine. This object is attained by printing the design on but one strip in the manner above noted, with the coating thus aggregatively produced being of a predetermined thickness, and subsequently transferring a portion of the thickness of the coating and the design depicted thereby in toto from the one printed strip to a second strip, for example, by superimposing the second strip upon the printed face of the first strip and subsequently separating the two strips, whereby the coating which has been applied to the first strip by the series of printing heads or blocks is split in a median plane between the two strips and divided substantially equally between the two strips, thereby producing two identical finished products, i. e., two products finished, at least insofar as the printing or formation of the design on the two strips is concerned, it being understood that after the printing and drying of the aggregated design coating of a felt base floor covering the printed strip is sometimes given a finished coat of transparent varnish, lacquer, or the equivalent to preserve the design surface against wear.

The method and apparatus for putting the present invention into effect will be fully disclosed hereinafter, reference being had to the accompanying drawings, of which Fig. 1*a* and Fig. 1*b*, combined, constitute a diagrammatic longitudinal sectional elevation of the printing machine and dryer arranged in tandem;

Fig. 5 is a perspective view, partly in section, illustrating the transfer of the pattern from the originally printed sheet to the inverted second sheet and the reversing of the second sheet to bring the design bearing face uppermost;

Fig. 6 is a transverse sectional elevation taken on the line 6—6, Fig. 5;

Fig. 7 is an enlarged longitudinal sectional elevation of one mechanism for transferring the printed design from the originally printed sheet to the second sheet;

Fig. 13 is a view similar to Fig. 12 and shows a modification of the intermittent rotary transfer;

Fig. 16 is a view similar to a portion of Fig. 1*b* and illustrates a modified arrangement for handling the second sheet between the transfer and the placing of the sheet in the drying oven;

Fig. 17 illustrates a preliminary step in the handling of the second sheet, as shown in Fig. 16, or a modification thereof;

Fig. 19 is a detail view showing one method and means for synchronizing the movements of the original and second sheets after transfer.

Figure 1:
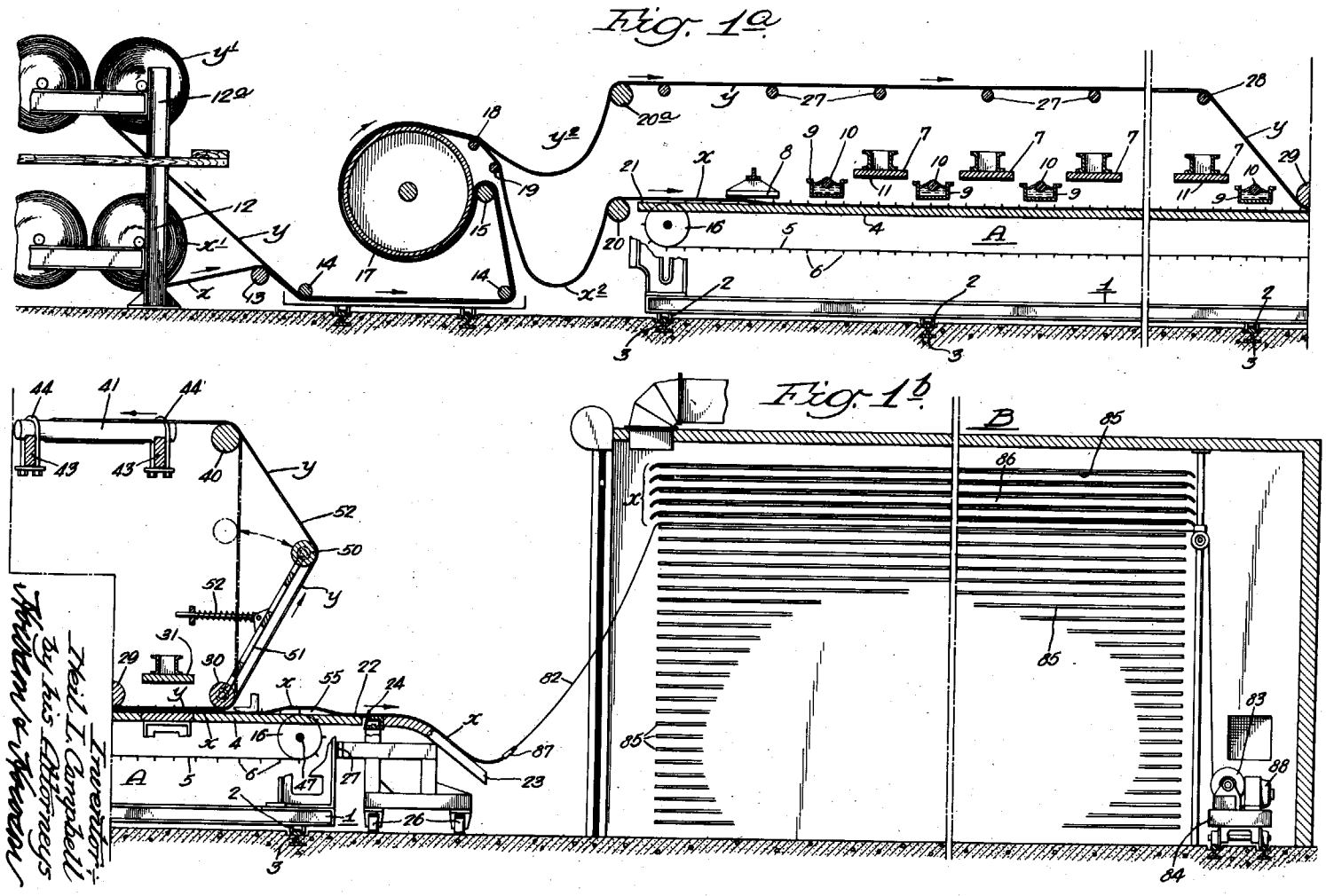

As shown in Figs. 1*a* and 1*b*, the block printing machine A employed in connection with the present invention, for the purpose of illustration, is of the standard well known type employed normally in the printing of felt base floor coverings, and consists primarily of a long substantially rigid main frame 1 which is mounted on flanged wheels or rollers 2 arranged to ride on rails 3. The rails 3 extend transversely of the machine at relatively spaced points along the length of the machine. The frame 1 supports a rigid longitudinally extending and horizontally disposed platform 4. At each of the opposite sides of the platform 4 is an endless belt 5 which is provided with pins 6 at relatively spaced points throughout its length. The pins 6 are adapted to pierce the strip of felt *x*, which is disposed on the platform 4, adjacent the opposite marginal edges solely of the strip *x*. The belts 5 pass around drums or sprockets 16 which are intermittently rotated to a predetermined extent for correspondingly advancing the sheet or strip *x* step by step, beneath a series of vertically reciprocable printing blocks 7, 7. Also vertically reciprocable with the printing blocks 7, 7 is a press block 8 which presses the side edges of the sheet or strip *x* down onto the pins 6 of the belts 5.

The means for intermittently rotating the sprockets or drums 16, and for vertically reciprocating the blocks 7 and 8 in definite time relation to the movements of the sheet *x*, forms no part of the present invention and as such mechanism is a standard part of the block printing machine the same has been eliminated from the present drawings for the sake of simplicity.

Likewise, the paint pots 9 which are provided with rollers 10 for making contact with the printing surfaces 11 of the printing blocks 7, and which, for the purpose of making such contact, to apply the pigment to the printing surfaces 11 of the blocks 7, are reciprocated longitudinally of the machine, beneath the printing blocks 7, when said printing blocks are in a raised position is effected in synchronization with the movements of the sheet, the belts 5 and the printing blocks 7 by mechanism standard to the machine, and which, therefore, has been eliminated from the present drawings.

Normally, the strip *x* is received in the form of a roll *x1* which, as shown in Fig. 1*a* is mounted on a suitable rack 12. The strip *x* is threaded over and under rollers 13, 14 and 15 to and around a drum 17 and from said drum over rollers 18 and 19 to and around a roller 20 disposed adjacent the feed end 21 of the platform or table 4 which forms the backing up platen for the printing operation.

From the roller 20 the strip *x* is fed under the press block 8 and is pressed onto the pins 6 of the belts 5 thereby. The belts 5, as noted above, move the strip *x* intermittently along the printing table 4, to the delivery end 22 of said table (see Fig. 1*b*) from which the strip *x* passes over a cutting table 23, which is provided with a transversely reciprocating knife 24 by which a printed strip is severed into completed sheets of predetermined length, preparatory to or during introduction of a leading end of such sheet into and through the drying oven.

Figure 2:
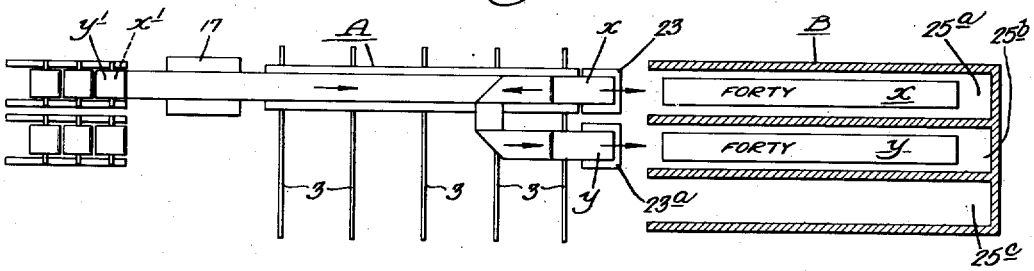
Figs. 2, 3 and 4 are diagrammatic plan views of the arrangement shown in Figs. 1*a* and 1*b*, with the dryer in section.
Figure 3:
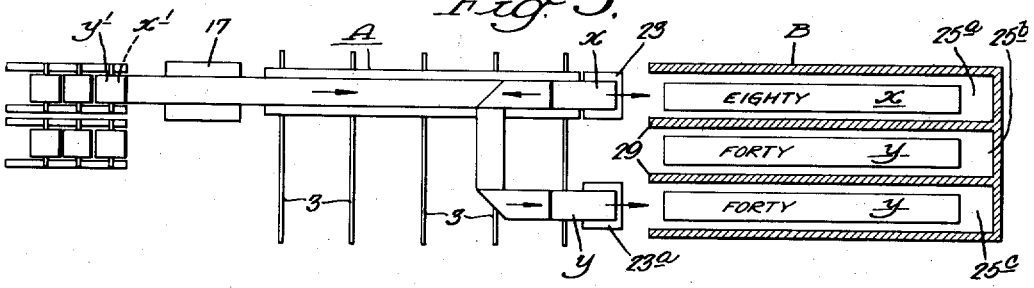
Figure 4:
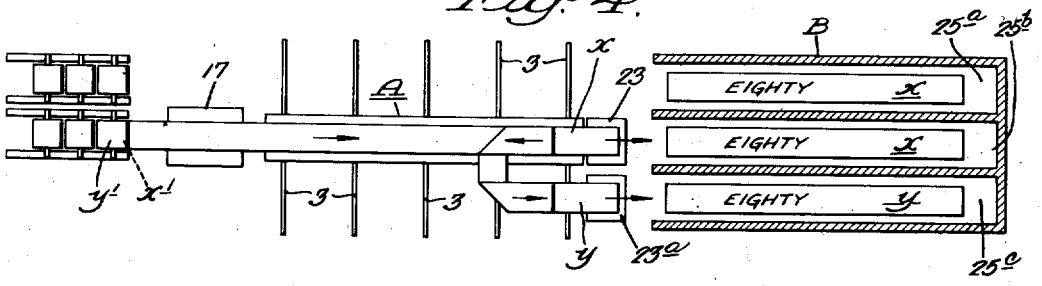

The drying oven B is stationary, and, as shown in Figs. 2, 3 and 4, comprises a plurality of individual compartments 25*a*, 25*b* and 25*c*.

In order to align the printing table 4 of the printing machine A and the cutting table 23 with any one of the plurality of compartments of the drying oven B, the machine A is bodily moved transversely, by means of the rollers 2 and rails 3, into the desired position and the cutting table 23, being provided with suitable supporting rollers 26, and if desired, rigidly connected to the frame 1 of the printing machine as at 27, Fig. 1*b*, is moved with the printing machine A into line with the compartment of the drying oven B which is to be loaded with strips or sheets *x* after the printing thereof by the block printing machine.

In carrying out the present invention, the rack 12, on which a plurality of the rolls *x1* may be mounted, is extended vertically to provide an upper dack 12*a* for the reception of a plurality of rolls *y1*, to provide the second strip or sheet *y* to which the printed pattern is to be transferred from the originally printed strip or sheet *x*, after completing of the printing of the design on the sheet *x*.

The sheet *y* is led from the roll *y1* under the rolls 14, 14 around the roll 15 and the drum 17, then over the roll 18 from which the sheet *y* passes to a roll 20*a* which forms one of a series of rolls 27 disposed above the highest point of elevation of the printing blocks 7 or any part thereof for supporting the strip *y* above substantially the full length of the printing machine A.

The strips or sheets *x* and *y* are gripped in a bite between the peripheral surfaces of the roll 15 and the drum 17 said roll and drum, or one or the other being driven either intermittently at the same rate of travel as the belts 5 or continuously to draw the strips or sheets $x$ and $y$ off of the rolls $x1$, $y1$ respectively, for feeding thereof to the rolls 20 and 20$a$ at the receiving end 21 of the platform or table 4. Preferably the drum 17 is continuously driven to avoid shock by starting and stopping the rotation of the heavy rolls $x1$, $y1$; and in order to keep a constant supply of the strips $x$, $y$, the speed of the drum 17 is controlled, with respect to the intermittent movements of the strips or sheets $x$, $y$, in such a manner as to provide loops $x2$, $y2$ between the drum 17 and the rolls 20 and 20$a$.

In that form of the invention shown in Figs. 1$a$ and 1$b$, the strip or sheet $y$ passes from a roll 28, near the delivery end 22 of the table 4, under a pair of rolls 29 and 30 which extend transversely of the machine A at opposite sides of the last of the series of vertically reciprocable heads of the machine, such as the heads which respectively carry the printing block 7, and which is indicated at 31 in Fig. 1$b$.

As shown in Fig. 1$b$, and in the enlargement thereof, Fig. 7, the rolls 29 and 30 are so positioned with respect to the printing table 4, that the portion $y3$ of the strip or sheet $y$, which extends from the roller 29 to the roller 30, is held in superposed vertically spaced parallel relation to the corresponding portion of the strip or sheet $x$ which is passing along the table 4 and in such close relation thereto as to provide a very small amount of clearance or space 32 between the strip portion $y3$ and the upper surface of the aggregated coating or layer of viscous pigment $z$ which has been successively and periodically deposited and built up on the sheet or strip $x$ by the individual deposits applied thereto by printing surfaces 11 of the various printing blocks 7 respectively.

The block 31, which for the purpose of distinguishing from the printing blocks 7, will be hereinafter referred to as the "transfer head", receives vertical reciprocation at the same time as and together with the printing blocks 7, whereupon the under surface 33 of the block 31 is caused to engage the upper surface of the portion $y3$ of the strip or sheet $y$; and to press the portion $y3$, which lies directly below the head 31, downwardly until the lower surface of the strip portion $y3$ makes a substantially uniform flat contact with the upper surface of the design coating $z$ previously deposited on the upper surface of the strip $x$.

The viscous nature of the pigments and the condition of the surface of the strip $y$ are such that the momentary contact causes the upper surface of the aggregated coating $z$ to adhere firmly to the under surface of the strip $y$, to the same degree substantially as the deposited layer $z$ is adhering to the upper surface of the strip $x$, whereupon, as the head 31 moves upwardly, the coating $z$ is split, in a median plane substantially equidistant from and between the under surface of the strip $y$ and the upper surface of the strip $x$, into substantially two equal parts, as shown at $z1$ and $z2$ in Fig. 7, the one half of the deposit, and which is shown at $z1$, adhering to the sheet or strip $x$ while the second half $z2$ adheres to the strip or sheet $y$. The effect obtained is that the design previously printed on the strip or sheet $x$ is transferred identically to the strip or sheet $y$.

In order to make the design coatings $z1$ and $z2$ of sufficient thickness to provide a substantially wearing surface on the strips $x$ and $y$ respectively, the deposits of the viscous pigments applied by the printing blocks 7, 7 are preferably heavier than would normally be applied to a single sheet, when that single sheet constitutes the sole finished product as in the normal manner of producing these products prior to the present invention.

In order to prevent any relative lateral, longitudinal or other horizontal movement between the strips or sheets $x$ and $y$, during the transfer operation, both strips $x$ and $y$ are secured together against relative horizontal movement by the pins 6 of the conveying tapes or belts 5 penetrating both strips or sheets $x$ and $y$, which, while preventing relative horizontal movement between the two sheets, will allow for the relative vertical movement between the sheets necessary for effecting the transfer.

In order to prevent the second or top strip or sheet $y$ from sagging between the rolls 29 and 30, the portion $y3$ of the upper superposed strip $y$ is held under tension.

As a result of the pins 6 passing through both the lower strip $x$ and the superposed strip $y$, between the rolls 29 and 30, the movement of the strip $x$ by the belts 5 produces an identical movement of the superposed strip $y$, thus relative movement between the two is prevented and absolute indexing of the successive transfers below the head 31 is assured; and at the same time the sheet $y$ is maintained under tension between the rolls 29 and 30.

Furthermore, tension on the strip $y$ is maintained by the weight of the length of that portion of the strip extending from the drum 17 through the loop $y2$ and over the rolls 20$a$, 27 and 28, to the roller 29.

The tension beyond the roll 30 is maintained by pins 35 carried by belts 36, 36 disposed at opposite sides of the sheet $y$, as shown in Fig. 5, which draw the strip $y$ from the transfer point on the roll 30 and deliver the strip to a cutting table 23$a$ which is disposed adjacent the cutting table 23 over which the lower sheet $x$ is delivered by the belts 5, 5.

The cutting table 23$a$ is provided with a reciprocating knife corresponding to the knife 24 of the table 23.

As a result of the above noted arrangement, in place of one strip being delivered from the cutting table 23 to the drying oven B, a pair of identical strips or sheets are simultaneously delivered to different compartments respectively of the drying oven.

In order to deliver the strip or sheet $y$ to the oven B with the design face thereof uppermost, it is necessary to reverse or invert the strip $y$. As shown in Fig. 5 the top strip or sheet $y$, after passing around the roll 30, passes upwardly and around a roller 40, from which the strip or sheet $y$ passes backwardly over the machine A, i. e., in a reverse direction to that in which it has been moving prior to the transferring of the pattern thereto from the originally printed sheet or strip $x$. This brings the printed surface upwardly, with the strip $y$ moving in an opposite direction to the strip $x$. In order to feed the strips $x$ and $y$ into the dryer simultaneously it is necessary to reverse the direction of movement of the sheet or strip $y$ and for this purpose the strip or sheet $y$ after passing around the roll 40 passes to and around a turnover bar or roller 41 which is supported at an angle of substantially 45 degrees to the rearwardly moving portion of the sheet $y$. After passing around the turnover element 41 the strip $y$ moves transversely to the printing machine, with the design face down, and around a second turnover element 42. This brings the design face up and again reverses the direction of movement of the strip $y$ to correspond to the direction of movement of the strip $x$ and with the two strips in parallel laterally spaced relation to each other for feeding into the drying oven.

If desired the elements 41 and 42 may be in the form of rollers driven at a peripheral speed equal to or slightly greater than the normal linear speed of the strips $x$ and $y$ in passing through the printing machine A, as shown in Fig. 5, or the rollers may be mere idlers. Any suitable form of drive may be employed for rotating the rollers 41 and 42.

Figure 14:
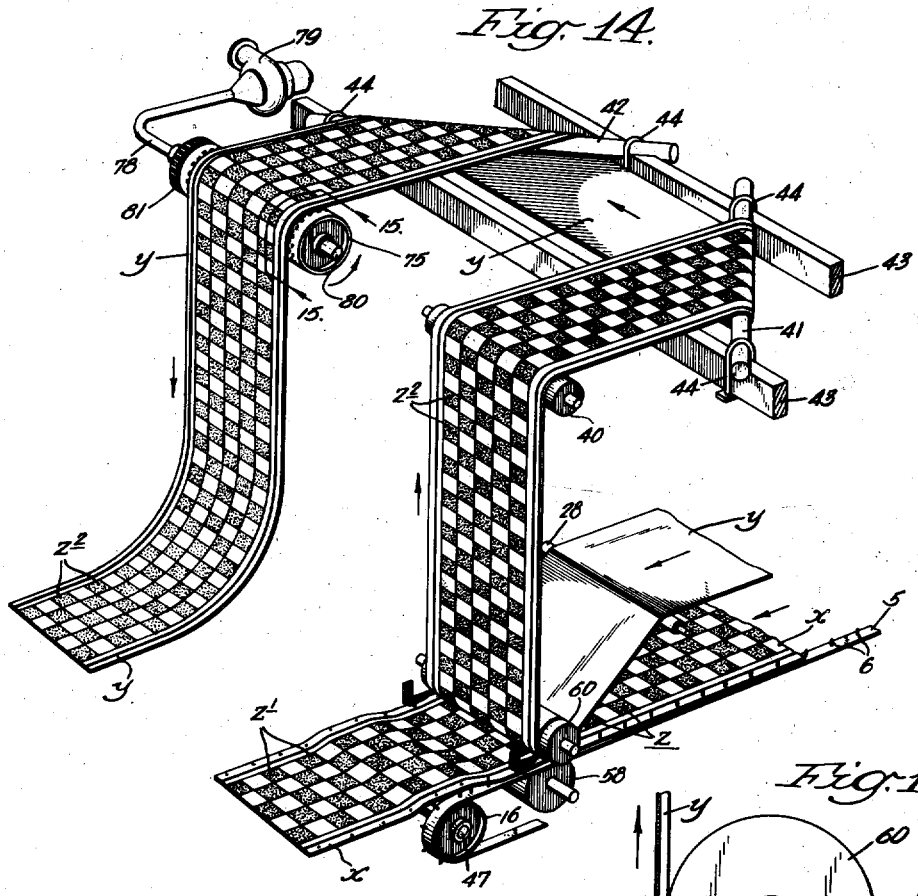
Fig. 14 is a view similar to Fig. 5, and shows the intermittent rotary transfer of Fig. 12 and a modified form of sheet reversing mechanism in connection therewith.

The rollers 41 and 42 are rotatably mounted in bearings 44 carried by and adjustably secured to beams 43 in the present instance. However, as shown in Fig. 14 the elements 41 and 42 may be in the form of rigid bars adjustably secured to the beams 43 by clamps or other securing means. In either case the two turnover elements 41 and 42 are mounted on the beams 43 in such a manner that they may be moved closer together or further apart, as desired.

As previously noted, the strip $x$ is advanced step by step by the belts 5 and pins 6 thereon. The strip $y$ is correspondingly advanced by said belts and pins as previously noted. In some instances it may be desirable to advance the strips $x$ and $y$ simultaneously and intermittently from the cutting tables 23 and 23$a$ respectively into the drying oven. In that case the supplementary driving device for the strip $y$ which comprises the belts 36 with the pins 35 thereon may be driven directly from the drive which advances the belts 5 and for that purpose, as shown in Fig. 19, the shaft 45 which carries the drums or sprockets 46 for the lower ends of the belts 36 may be connected to the shaft 47 which supports the sprockets or drums 16 for the belts 5 at the delivery end 22 of the table 4, by a connecting shaft 48. Under such circumstances the sheet $y$ between the rollers 30 and 40 would move in a straight vertical line from the roller 30 to roller 40, as shown in broken lines in Fig. 5.

At other times it may be desirable to take off the strip $y$ in a continuous uninterrupted movement, in which case the connection 48, above referred to, is eliminated and a separate continuous drive of any suitable form, such as an independent motor with a variable speed connection to the shaft 45 may be employed. In order to compensate for the differences of conditions arising from the intermittent movement of the sheet $y$ up to the roller 30 and the continuous movement of the sheet beyond the roll 40, a slack takeup mechanism shown in Figs. 1$b$ and 5 is provided. This mechanism comprises a roller 50 which engages the strip $y$ intermediate the rolls 30 and 40 and which is freely rotatably mounted at the outer end of a swing frame 51.

The frame 51, as shown in Fig. 1$b$, is pivotally mounted in the present instance on the axis of the roller 30. A spring 52 tends at all times to swing the frame 51 and the roller 50 to the right, as viewed in Fig. 1$b$, to provide a tensioned loop 52 in the sheet $y$. As the sheet $y$ advances intermittently from the roll 30, with the roll 40, for example, moving at a lower rate of speed than the sheet receives during each intermittent movement thereof, the spring 52, swinging the frame 51 and the roller 50 about the axis of the roll 30, takes up any slack which would otherwise develop in the strip $y$, between rolls 30 and 40. Then, during the rest period between the intermittent movements of the sheet or strip $y$ at the roll 30, the roll 40, revolving at a constant rate of speed, continuously pulls the strip $y$ and causes the loop 52 to be reduced, whereby the roller 50 is swung in an opposite direction against the action of the spring 52 and the tension of the strip $y$ is thereby maintained constant during the conversion of the intermittent movement of the strip into a constant movement thereof.

The strip $y$, as it approaches the upper drum 49 around which the belts 36 pass, is pressed down onto the driving points or pins 35 by a pair of grooved face rollers 53 rotatably mounted adjacent the drum or sprockets 49, as clearly shown in Fig. 5. The strip $y$ is stripped from the pins 35 at the lower end of the bands or belts 36 by the strip $y$ moving over the table 23$a$ at an angle to the plane in which the strip is held on the bands or belts 36.

In a like manner the strip $x$ is stripped from the pins 6 of the bands 5 by any suitable means such as an incline 55 on the table 4 adjacent the delivery end 22 thereof as shown in Fig. 1$b$. This incline may extend completely across the table or be arranged merely at the edges of the table and form a bridge directly above the sprockets or drums 16 about which the belts 5 pass, whereby the strip $x$ is lifted off the pins of said belts.

Figure 11:
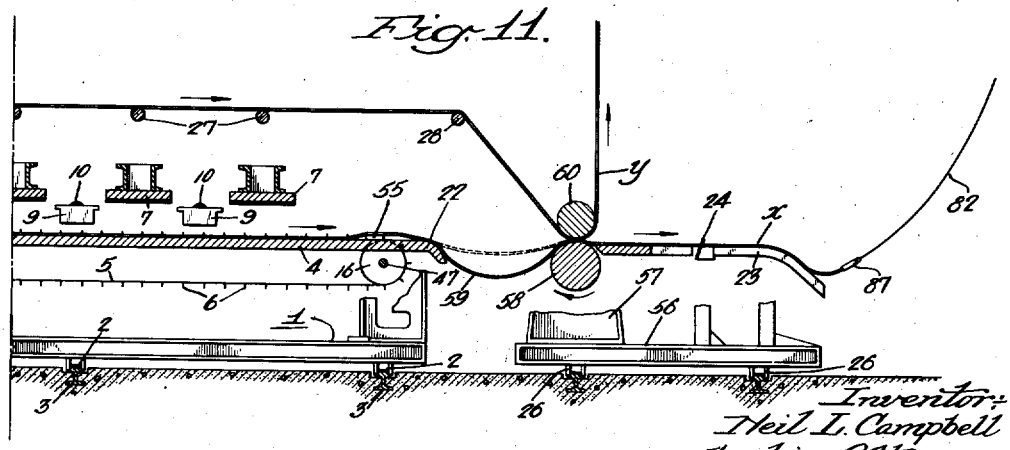
Fig. 11 illustrates a modification of the invention wherein the transfer is made by continuous rotary contact.

At times it may be desirable to feed the lower strip $x$ continuously into the drying oven B, at the same time as the strip $y$ is being fed continuously to the dryer. In this case, as shown in Fig. 11, the table 23 may be completely disconnected from the frame 1 of the printing machine and the framework 56, which supports the table 23, may be provided with supports 57 for a roller 58 over which the strip $x$ passes from the delivery end 22 of the table 4, the feeds being so regulated that a loop 59 is at all times maintained between the delivery end 22 of the table 4 and the roller 58, whereby the intermittent movement of the strip $x$ from the table 4 may be readily converted to a continuous movement over and beyond the table 23.

Figure 12:
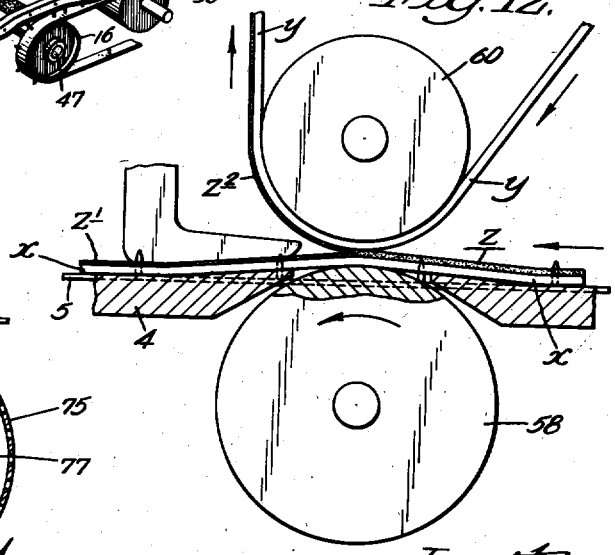
Fig. 12 is an enlarged sectional elevation showing an intermittent rotary transfer of the pattern from the originally printed sheet to the second sheet.

It may also be desirable to effect the transfer of the pattern from the primary printed sheet or strip $x$ to the second sheet or strip $y$ as a continuously rotary operation, in which case a second roll 60 may be provided directly above the roll 58 with the two rolls coupled together and driven by any suitable means at the same peripheral speeds, the positioning of the roller 60 with respect to the roller 58 being such that the under surface of the strip $y$, at the bite between the rolls 58 and 60, is brought into contact with the upper surface of the printed coating $z$ on the strip $x$, as clearly shown in Fig. 12, whereby, as the rollers 58 and 60 rotate at the same peripheral speeds, the cooperative tangential relation of the rollers will first cause adherence of the upper surface of the printed coating $z$ to the undersurface of the strip $y$ and then substantially equal splitting of the coating as the two strips advance beyond the rolls 58 and 60, leaving substantially one half ($z1$) of the coating on the strip $x$ and the second half ($z2$) of the coating on the strip $y$, the pattern previously provided by the deposited pigment forming the printed coating $z$ being duplicated in toto on the two strips $x$ and $y$ respectively.

As shown in Fig. 12, the transfer may be made by intermittently rotating the rollers 58 and 60, in which case the roller 58 merely raises the lower strip $x$ slightly above the surface of the table 4 with the roll 60 being arranged to press the strip $y$ against the coating $z$, as clearly shown in said figure. In this case the rotation of the rolls 58 and 60 would be effected in synchronization with the intermittent movement of the bands 5, so that the bands 5, the roll 58, and the roll 60, all rotate or move at exactly the same linear speed. This may be readily accomplished by any suitable form of transmission mechanism, for example, with variable speed control so that the rotation of the rolls 58 and 60 may be synchronized with the linear movement of the bands 5, accurately, to prevent differential movements therebetween, which would result in destroying the perfect transfer of the pattern from the sheet or strip $x$ to the sheet or strip $y$.

As shown in Fig. 13 the roll 58 may be supplanted by a platen 61 which may be adjusted vertically through an opening 62 formed in the table 4 immediately below the transfer roller 60.

In order to effect proper aligning of the strip engaging surface of the roll 60 with the strip supporting surface of the platen 61, said platen is supported by an elevator 63, which may be supported by jack screws, wedges or other adjusting mechanism, in any suitable manner, on and relative to the framework 1 of the machine A.

Delicate aligning of the surfaces may be accomplished by the provision of shims 64 inserted at desirable or necessary points between the adjusting elevator 63 and the platen plate 61, whereby the splitting of the printed coating $z$, into two portions of substantially equal thicknesses throughout as illustrated at $z1$ and $z2$, may be accomplished. For the same purpose, i. e., for securing accurate aligning of the web or strip supporting surfaces, shims 65 may be provided between the block 31 of the transfer head shown in Fig. 7 and the vertically reciprocating frame 66 which carries and operates the contact block 31.

In a like manner an adjustable portion 66 may be provided in the table 4 directly under the block 31 and provided with a more or less resilient pad 67 over which the strip $x$ is moved by the bands 5 and which produces a cushioning effect during the pressing of the upper strip $y$ into contact with the upper surface of the printed coating $z$ previously deposited on the strip $x$. In this way an even contact over the entire pressed surface may be effected.

Figure 8:
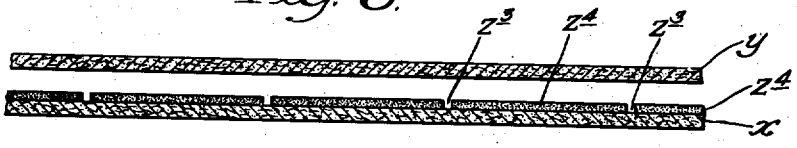
Figs. 8, 9 and 10 are enlarged longitudinal sectional views of the two sheets illustrating the manner of transferring the design from the original to the second sheet by flat, pressed contact, as in Figs. 1*b* and 7.

In order to provide clean cut lines of demarcation between adjacent portions of the design deposited on the strip $x$ at different times successively by the various printing blocks 7, it may be desirable to cut the printing blocks slightly undersize around the marginal edges of each of the various portions of the design respectively deposited on the strip $x$ by the various printing blocks 7, leaving, as clearly shown in Figure 8, a space $z3$ between the edges of each of the adjacent portions $z4$ of the design. Then as the strip $y$ is lowered into contact with the upper surface of the aggregate deposit on the strip $x$, and as pressure is applied in the direction of the arrows in Fig. 9 by the printing head block 31, the various independent deposits $z4$ are caused to spread until the marginal edges of the parts $z4$ make contact and thereby form clean cut lines, as illustrated at $z5$ in Fig. 9. Then, as the strips $x$ and $y$ are separated, as shown in Fig. 10, the half portions $z1$ and $z2$ of the printed coating $z$ break clean and provide clean cut lines of demarcation between various elements of the completed design on each of the strips $x$ and $y$ respectively.

Such procedure is more particularly desirable in the making of block designs and is not particularly necessary in the printing of foliage or similar designs where sharp lines of demarcation are not essential. However, in other instances where block or tile designs are formed and lines of division between adjacent blocks, composed of a color different from that of either series of blocks, are to be included in the design, a pigment forming such lines may be deposited separately as a last step in the completion of the printed design and would cover the edges of the blocks previously deposited and thus provide the clean cut lines of demarcation, representing, for example, mortar lines between blocks representing tile.

Figure 9:
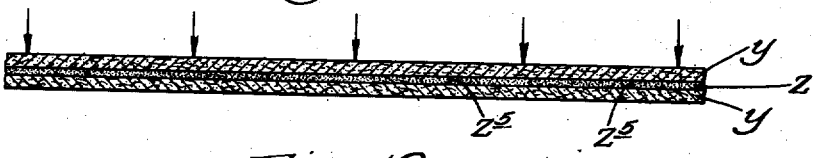
Figure 10:
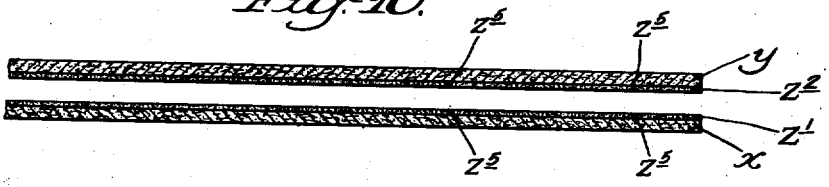

In other instances the deposits forming the mortar lines may be deposited in the spaces $z3$ shown in Fig. 8 to complete the entire design surface, with all parts in actual abutting relation to each other before the transfer of Figs. 9 and 10 is begun.

Figure 18:
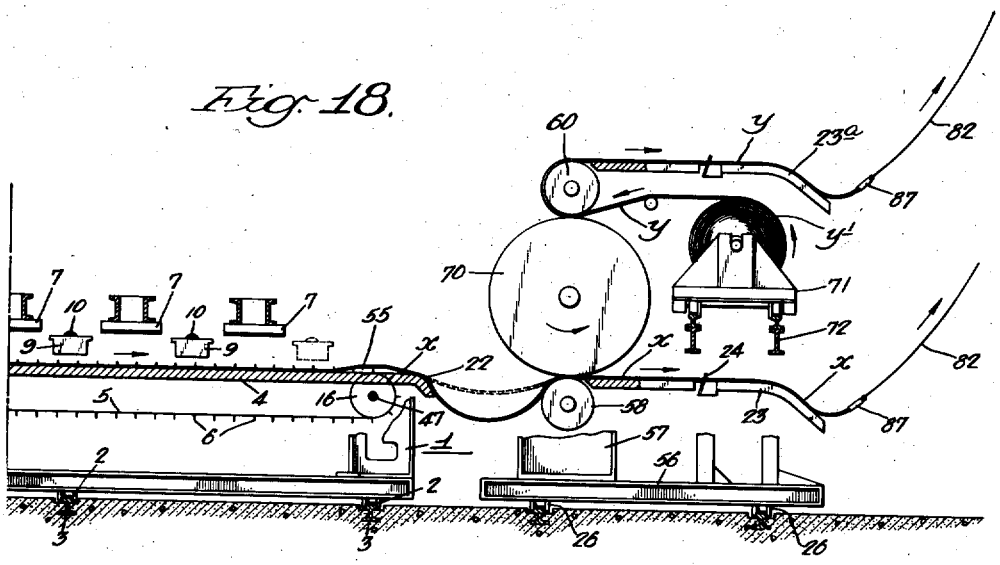
Fig. 18 is a modification of the invention illustrating the use of an intermediate transfer element between the originally printed sheet and the second sheet.

In some instances it may be desirable to employ a transfer element intermediate the strips $x$ and $y$ for picking up a portion of the thickness of printed coating in toto, corresponding to the portion $z2$, from the coating $z$ applied to the printed sheet or strip $x$ and carrying such portion from the strip $x$ to the strip $y$, at a point remote from the strip $x$, as shown in Fig. 18, wherein a transfer drum 70 is employed for the purpose.

In the case above noted, the roll $y1$, providing the strip $y$, would be mounted on a truck 71 adjustable on rails 72 transversely with respect to the machine, beyond the delivery end 22 of the table 4. In this case the uprights 57 of the framework 56, which support the cutting table 23, would be extended to support the transfer roll 70 and the roll 60, about which the sheet or strip $y$ passes, in definite relationship to each other and properly adjusted to effect the picking up of the one half of the coating $z$ by the drum 70 from the strip $x$ and depositing the same in toto on the strip $y$ passing around the roll 60.

The cutting table $23a$, for the strip $y$, would likewise be supported in this case in superposed relation to the table 23 for the strip $x$, directly above the table 23, the whole structure being movable transversely with the frame 1 of the printing machine A on the rails disclosed in Fig. 18. The truck 71 in this case would be movable relative to the frame 56 in order to replenish the rolls $y1$ from time to time.

The advantage of such a structure would reside in the fact that the roll $y1$ could be mounted immediately adjacent the transfer mechanism and would make it unnecessary to draw the strip $y$ the full length of the printing machine A, in superposed relation thereto, as disclosed in Figs. $1a$ and $1b$.

Figure 15:
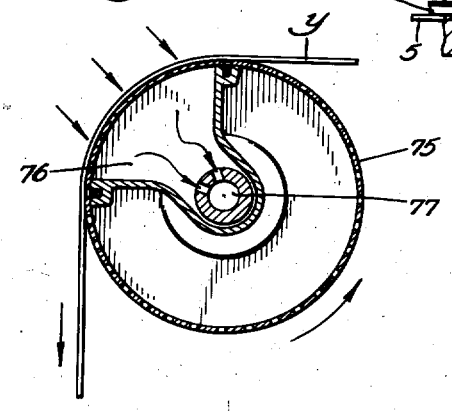
Fig. 15 is a sectional elevation taken on the line 15—15, Fig. 14.

In place of the driving belts 36, for the strip $y$, as shown in Fig. 5, the strip $y$ may be advanced either intermittently or continuously by means of a vacuum or suction roll 75, shown in Figs. 14 and 15, said roll comprising a perforated drum around which, throughout any suitable segment of its periphery, the strip $y$ passes. Within this segment and within the perforated drum 75, a suction nozzle or chamber 76 is provided and from which air is exhausted through a hollow axle 77 about which the drum 75 rotates. The hollow axle is connected, by any suitable means such as a pipe 78, to any suitable form of vacuum or evacuator pump 79, with the pipe 78 connected to one end of the hollow axle 77.

The opposite end of the axle 77 may be closed, as illustrated at 80, and function as a solid trunnion for the roll 75, for providing support for said end of the drum and to which power may be applied for rotating the drum from any suitable source of power. In other instances the closed end of the hollow shaft 77 may be rigidly supported against rotation in suitable bearings and power applied from a suitable source to a gear wheel 81 mounted on one end of the drum 75 and providing rotation of the drum 75 around and relative to the shaft 77.

The dryer B, as noted above, is divided into a plurality of compartments 25*a*, 25*b*, and 25*c* and each compartment is provided with a plurality of horizontal shelves 85. For example, each compartment may contain eighty shelves with each shelf adapted to accommodate a complete strip of finished floor covering which, as noted above, in commercial practice are each eighty feet long. However, these numbers and measurements are immaterial insofar as the invention is concerned. Also, the dryer may include any number of compartments.

As noted above, in normal practice the printing machine is aligned first with one compartment and the individual strips or sheets are drawn from the cutting table 23 and fed onto the shelves 85 of the dryer B until the one compartment is completely loaded, after which the whole machine is moved laterally into alignment with the next compartment for loading the same while drying is being effected in the previously loaded compartment.

The machine is moved relative to the dryer for the loading of each of the successive compartments and after the drying is completed in the first loaded compartment the dried strips are removed therefrom, leaving the compartment vacant for reloading after the last of the compartments of the dryer has been filled with freshly printed strips. Whereupon the machine is moved back into line with the emptied compartment for a repeat of the operations.

Where two sheets are provided by a single printing operation, in accordance with the present invention the loading of the compartments is modified. For example, as shown in Fig. 2, the machine A and the cutting table 23 for the strip *x* are aligned with the compartment 25*a*. With the machine A and the cutting tables arranged in this manner the compartments 25*a* and 25*b* will be simultaneously loaded to half the capacity thereof. For example, forty strips *x* will be run into compartment 25*a*, while forty strips *y* will be run into compartment 25*b*. The table 23*a* is then shifted into line with compartment 25*c* while the table 23 remains in line with the compartment 25*a*. Forty more strips *x* are then run into the compartment 25*a* while forty strips *y* are simultaneously being run into compartment 25*c*, as shown in Fig. 3. The table 23*a* for the strips *y* is permitted to stand in line with the compartment 25*c* while the printing machine A and the table 23 are shifted from alignment with the compartment 25*a* into alignment with compartment 25*b*, as shown in Fig. 4. Forty strips *x* are then run into compartment 25*b* while forty additional strips *y* are run into compartment 25*c*, thereby completing the loading of the drying oven B.

As the drying progresses the strips may be removed in the order in which they have been inserted, in that way providing empty space for the reception of subsequently printed and transferred strips. Obviously, if greater drying time is required or if slower drying is desired the capacity of the dryer may be multiplied to any desired extent, to keep pace with the printing, and the machine and other equipment may be moved into line with compartments thereof accordingly.

Any suitable means may be provided for drawing the strips *x* and *y* into the dryer B, for example, a cable 82 connected to a power driven drum 83 carried by a laterally shiftable truck 84 may be threaded through the spaces 86 between the shelves 85 and connected, by suitable clamps 87, to the strips *x* and *y* as the case may be, whereby power applied to the motor 88, which drives the drum 83, will effect drawing of the strips longitudinally of the dryer and the deposit thereof on the shelves 85.

In other instances the sheet *y*, as shown in Fig. 16, may be hung in festoons over poles 90 prior to being drawn into the dryer B, thereby eliminating the necessity for the reversing mechanisms of Figs. 5 and 14, in which case the strip *y* after receiving the transfer is drawn backwardly with its printed side upwardly across the poles 90 and hung in festoons therebetween, as shown in Fig. 16 or permitted to lie flatly over the poles or over slats extending from pole to pole as shown in Fig. 17, until the full length of a strip has been completed, whereupon the cable 82 may be connected to the one end of the strip *y* and the strip drawn in a reverse direction over the poles 90 and directly into the drying compartment. In this case, as in Fig. 18, the strips *x* and *y* would be superposed directly above each other, whereupon forty strips *x* and forty strips *y* would be run into the first compartment 25*a* simultaneously and the entire machine moved into line with compartment 25*b* for loading thereof, and so on.

Normally the strips *x* and *y* are in excess of nine feet in width to receive designs nine feet wide and still provide margins for receiving the pins 6 of the advancing belts 5 outside the design. In some instances the designs are continuous throughout the length of the strips and in other instances the designs are arranged to provide rugs of nine feet in width and three, six, nine or twelve feet etc. in length.

In some instances, both strips may be of lesser width, i. e., instead of being nine feet in width they may be only six feet in width. The conventional machine A described above, is normally adapted to accommodate strips of varying widths, and for this purpose one or both of the drive belts 5, 5 and their drums 16, are shiftable laterally with respect to the table 4, as is common in machines of this type.

As shown in Figs. 5 and 6, the strip *y*, between the drive belts 36, 36 is supported by a slatted or other platform 91. This platform is made with a removable center portion 92 whereby the platform may be reduced in width from nine to six feet, for example. Likewise the shafts which support the sprockets or drums which drive and support the belts 36, 36 are of a three-part telescopic form with the two ends keyed to the drum respectively and with sleeve sections 93 splined to the two end sections so that the drums and their respective shaft sections may be moved toward and away from each other as shown in Fig. 6.

It will be understood that the design, when transferred directly from one strip to the other, for example, from the lower to the upper strip, as in Figs. 1a, 1b to 16 inclusive, will appear in reverse, however, in the case of symmetrical designs, the two designs will appear as exact duplicates, whereas in the case of non-symmetrical designs, the design appearing on one strip will be in reversed position with respect to that appearing on the other strip. When an intermediate transfer element is used between the two strips, as shown in Fig. 18, the design on the second strip will be an exact duplicate of that originally printed on the first strip.

I claim:

1. The method of producing hard surface floor coverings which consists in depositing a viscous coating of facing material of predetermined thickness on one face of one prepared base sheet, and subsequently transferring a portion of the thickness of said face coating in toto onto one face of a second prepared base sheet, whereby duplicate finished floor coverings are produced by a single deposition of the facing material on but one of said base sheets.

2. The method of producing hard surface floor coverings which consists in printing a design on one face of one prepared base sheet in the form of a viscous coating of predetermined thickness, and subsequently transferring a portion of said thickness of said coating in toto onto one face of a second prepared base sheet, whereby said design is duplicated in toto on both base sheets as a result of a single printing of said design on but one of said base sheets.

3. The method of producing hard surface floor coverings which consists in printing a design on one face of one prepared base sheet in the form of a viscous coating of predetermined thickness as an aggregation of a plurality of design parts respectively disposed in laterally adjacent relation to each other, and subsequently transferring a portion of said thickness of said coating in toto onto one face of a second prepared base sheet, whereby said aggregative design is duplicated in toto on both base sheets as a result of a single printing of said design on but one of said base sheets.

4. The method of producing hard surface floor coverings which consists in printing a design on one face of one prepared base sheet in the form of a viscous coating of predetermined thickness as an aggregation of a plurality of design parts respectively disposed in laterally adjacent spaced relation to each other, subsequently spreading said parts into abutting relationship to each other and transferring a portion of said thickness of said coating in toto onto one face of a second prepared base sheet by first pressing said second sheet firmly against the exposed common planar surfaces of the parts of the design originally printed on the first of said sheets, subsequently splitting the coating intermediate the two sheets, and separating the split coating and the sheets to which the respective portions of the coating adhere, whereby said aggregative design is duplicated in toto on both base sheets as a result of a single printing of said design on but one of said base sheets, said design on said second sheet being in reversed position with respect to the design on the first mentioned sheet.

5. The method of producing hard surface floor coverings which consists in printing a design on one face of one prepared base sheet in the form of a viscous coating of predetermined thickness, bringing one surface of a second prepared base sheet into intimate contact with the exposed surface of the printed coating on the first said sheet, splitting the coating intermediate said sheets, and separating said sheets with the divided portions of the thickness of said coating adhering to said sheets respectively, whereby the design originally printed on the first sheet is transferred in toto onto the second sheet and two duplicate finished floor coverings are produced from a single printing of the design on but one of said base sheets, said design on said second sheet being in reversed position with respect to the design on the first mentioned sheet.

6. The method of producing hard surface floor coverings which consists in printing a design on one face of one prepared base sheet in the form of a viscous coating of predetermined thickness, bringing one surface of a second prepared base sheet into intimate flat contact with the exposed surface of the printed coating on the first said sheet, splitting the coating intermediate said sheets, and separating said sheets with the divided portions of the thickness of said coating adhering to said sheets respectively, whereby the design originally printed on the first sheet is transferred in toto onto the second sheet and two duplicate finished floor coverings are produced from a single printing of the design on but one of said base sheets, said design on said second sheet being in reversed position with respect to the design on the first mentioned sheet.

7. The method of producing hard surface floor coverings which consists in printing a design on one face of one prepared base sheet in the form of a viscous coating of predetermined thickness, bringing one surface of a second prepared base sheet into intimate rolling contact with the exposed surface of the printed coating on the first said sheet, splitting the coating intermediate said sheets, and separating said sheets with the divided portions of the thickness of said coating adhering to said sheets respectively, whereby the design originally printed on the first sheet is transferred in toto onto the second sheet and two duplicate finished floor coverings are produced from a single printing of the design on but one of said base sheets, said design on said second sheet being in reversed position with respect to the design on the first mentioned sheet.

8. The method of producing hard surface floor coverings which consists in printing a design on one face of one prepared base sheet in the form of a viscous coating of predetermined thickness, transferring a portion of said thickness of said coating in toto onto an element complementary to said base sheet and subsequently retransferring said transferred design in toto onto one face of a second prepared base sheet, whereby two duplicate finished floor coverings are produced from a single printing of the design on but one of said base sheets.

9. The method of producing hard surface floor coverings which consists in printing a design on one face of one prepared base sheet in the form of a viscous coating of predetermined thickness, subsequently transferring a portion of said thickness of said coating in toto onto one face of a second prepared base sheet, whereby said design is duplicated in toto on both base sheets as a result of a single printing of said design on but one of said base sheets, and feeding said two finished floor coverings simultaneously in spaced relation to each other into a drying chamber for setting the divided coating portions respectively adhering to the two base sheets.

10. The method of producing hard surface floor coverings which consists in printing a design on one face of one prepared base sheet in the form of a viscous coating of predetermined thickness, subsequently transferring a portion of said thickness of said coating in toto onto one face of a second prepared base sheet, whereby said design is duplicated in toto on both base sheets as a result of a single printing of said design on but one of said base sheets, and reversing the position of the second of said floor coverings relative to the first thereof after said transfer to bring the transferred coating uppermost for drying of the same with the floor covering supported from below.

11. The method of producing hard surface floor coverings which consists in printing a design on one face of one prepared base sheet in the form of a viscous coating of predetermined thickness, subsequently transferring a portion of said thickness of said coating in toto onto one face of a second prepared base sheet, whereby said design is duplicated in toto on both base sheets as a result of a single printing of said design on but one of said base sheets, reversing the position of the second of said floor coverings relative to the first thereof after said transfer to bring the transferred coating uppermost for drying of the same with the floor covering supported from below, and feeding the two finished floor coverings simultaneously into a dryer for setting the divided portions of the coating respectively adhering to said base sheets.

12. The method of producing hard surface floor coverings which consists in printing a design on one face of one prepared base sheet in the form of a viscous coating of predetermined thickness, subsequently transferring a portion of said thickness of said coating in toto onto one face of a second prepared base sheet, whereby said design is duplicated in toto on both base sheets as a result of a single printing of said design on but one of said base sheets, said design on said second sheet being in reversed position with respect to the design on the first mentioned sheet, reversing the position of the second floor covering relative to the first and feeding the two in laterally spaced relation to each other into a drying chamber for setting the divided coating portions respectively adhering to the two base sheets.

13. The method of producing hard surface floor coverings which consists in printing a design on one face of one prepared base sheet in the form of a viscous coating of predetermined thickness, subsequently transferring a portion of said thickness of said coating in toto onto one face of a second prepared base sheet, whereby said design is duplicated in toto on both base sheets as a result of a single printing of said design on but one of said base sheets, said design on said second sheet being in reversed position with respect to the design on the first mentioned sheet, reversing the position of the second floor covering relative to the first, and feeding the two in laterally spaced relation to each other into different laterally spaced drying compartments to set the divided coating portions respectively adhering to the two base sheets.

14. The method of producing hard surface floor coverings which consists in printing a design on one face of one prepared base sheet in the form of a viscous coating of predetermined thickness, subsequently transferring a portion of said thickness of said coating in toto onto one face of a second prepared base sheet, whereby said design is duplicated in toto on both base sheets as a result of a single printing of said design on but one of said base sheets, said design on said second sheet being in reversed position with respect to the design on the first mentioned sheet, reversing the position of the second floor covering relative to the first, feeding the two in laterally spaced relation to each other into different laterally spaced drying compartments to set the divided coating portions respectively adhering to the two base sheets, and shifting the relative lateral positions of the two finished floor coverings for feeding the sheets into predetermined drying compartments respectively of a series thereof.

15. The method of producing hard surface floor coverings which consists in depositing a viscous coating of facing material of predetermined thickness on one face of one prepared base sheet, subsequently transferring a portion of the thickness of said face coating in toto onto one face of a second prepared base sheet, whereby duplicate finished floor coverings are produced by a single deposition of the facing material on but one of said base sheets, and feeding said two finished floor coverings simultaneously in spaced relation to each other into a drying chamber for setting the divided coating portions respectively adhering to the two base sheets.

NEIL L. CAMPBELL.